June 3, 1924.
W. B. HERBST
TERMINAL SERVICE BOX
Filed Sept. 23, 1921
1,496,632
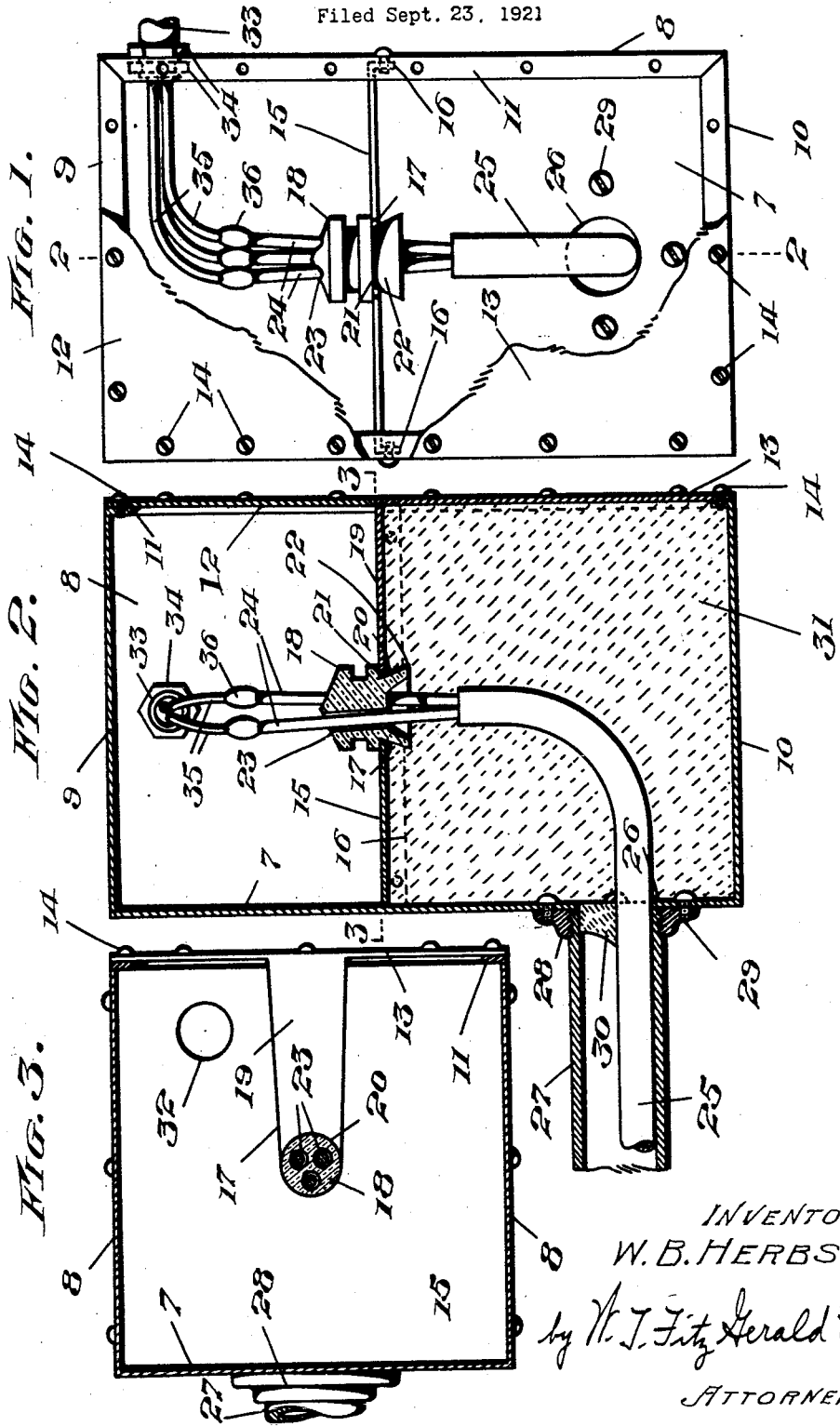
INVENTOR
W. B. HERBST,
by W. J. FitzGerald & Co.
ATTORNEY.

Patented June 3, 1924.

1,496,632

UNITED STATES PATENT OFFICE.

WILLIAM B. HERBST, OF PITTSBURGH, PENNSYLVANIA.

TERMINAL SERVICE BOX.

Application filed September 23, 1921. Serial No. 502,895.

*To all whom it may concern:*

Be it known that I, WILLIAM B. HERBST, a citizen of the United States, residing at Pittsburgh, in the county of Allegheny and State of Pennsylvania, have invented certain new and useful Improvements in Terminal Service Boxes; and I do hereby declare the following to be a full, clear, and exact description of the invention, such as will enable others skilled in the art to which it appertains to make and use the same.

The present invention relates generally to the insulation and protection of the terminals or connections of electrical conductors, and aims to provide a novel and efficient device for use at the point where a service cable enters a building, for sealing the cable against moisture, conductive dust agents and the like, as well as preventing electrostatic discharge either between the conductors of the cable or between the conductors and the grounded cable sheath, and the device also protecting the conductors between the cable conduit and consumer's conduit, to prevent theft of current or tampering with or injury to such conductors, where they establish connections between the service conductors leading into the building and the consumer's conductors or load wires of the building.

Another object is the provision of such a device comprising a casing to receive the terminal of the cable and having means for attachment to the end of the cable conduit, and means for insulating and sealing the terminal of the cable in a novel manner.

A further object is the provision of a novel casing of that kind having a sealing chamber for the terminal of the cable sheath and a connection chamber for the terminals of the cable and consumer's conductors and in which chamber the connections or joints between such conductors are made and to which access can be had under certain conditions to prevent unauthorized access to the conductors.

A still further object is the provision of such a casing having a shelf or partition therein arranged to receive and support an insulator in a novel manner for the passage of the cable conductors from the sealing chamber into the connection chamber.

It is also the object of the invention to provide such a terminal service box which is simple and inexpensive in construction, as well as being thoroughly practical and efficient in use.

With the foregoing and other objects in view, which will be understood as the description proceeds, the invention resides in the construction and arragement of parts, as hereinafter described and claimed, it being understood that changes can be made within the scope of what is claimed, without departing from the spirit of the invention.

The invention is illustrated in the accompanying drawing, wherein:

Figure 1 is a front view of the device, portions being broken away, and the insulating filler or material being removed.

Fig. 2 is a vertical section on the line 2—2 of Fig. 1 showing the insulating filler or compound in the sealing chamber.

Fig. 3 is a horizontal section on the line 3—3 of Fig. 2.

In carrying out the invention, there is provided a casing constructed out of sheet metal or other suitable material, and of suitable size according to the cross-sectional area of the conductors and other conditions. This casing includes the back wall 7, side walls 8, top 9 and bottom 10. The side walls, top and bottom have inturned flanges 11 at their forward edges for the abutment and attachment of upper and lower front panels or closures 12 and 13, respectively, which comprises a removable sectional front wall of the casing. Said panels or closures overlap the flanges 11 and are secured thereto by means of screws 14 or the like.

Between the top and bottom of the casing there is disposed a shelf or partition 15 of sheet metal or other suitable material which divides the casing into a sealing chamber underneath the shelf or partition and a connection chamber above said shelf. Said shelf is disposed in the plane of division between the panels 12 and 13 of the front of the casing, whereby the panel 12 closes the upper connection chamber, while the panel 13 closes the lower sealing chamber. Said shelf has flanges 16 at opposite edges bearing against and secured to the side walls 8 of the casing, for supporting said shelf in place. Although the casing is shown and described in upright position, it can be used in other positions if desired or necessary under different conditions.

The shelf or partition 15 not only separates the two chambers, but also serves as an insulator support, and, for this purpose, the shelf has a tapered slot 17 extending rearwardly from the front edge thereof to receive the insulator 18 which may be of glass, porcelain or other insulating material, and which is slid rearwardly into the slot before the panels 12 and 13 are applied to the casing, so that said insulator bears against the rear closed end of the slot. The lower panel 13 is provided at its upper edge with a tongue 19 extending rearwardly at an angle to fit within the slot 17, said tongue being tapered to readily enter the slot when the panel 13 is applied to the casing. The tongue 19 also has a concaved notch 20 at its rear end to fit the insulator 18. Said insulator has a shoulder 21 to seat on the shelf 15, and a flared portion 22 under the shoulder to engage under the shelf, whereby the insulator is retained within the opening when the panel or closure 13 is applied to the casing and the tongue 19 held within the slot 17. Said insulator has apertures 23 extending from within the portion 22 to the upper end or top of the insulator, for the upward passage of the terminals of the cable conductors. There may be two or more conductors 24, and the insulator 18 has a corresponding number of apertures for the upward passage of said conductors through the insulator.

The cable includes the usual lead sheathing 25 covering the conductors 24, and the back wall 7 of the casing has an opening 26 below the shelf 15 for the entry of the cable from the cable conduit 27 into the sealing chamber under the shelf, the cable sheathing 25 terminating within said chamber, while the terminals of the conductors are extended or inserted upwardly through the insulator 18 before the panel or closure 13 is applied to the casing.

The casing is secured to the end of the conduit 27 which enters the building as a branch from the main conduit, according to well known practice. Thus, a flange ring 28 is screw-threaded or otherwise secured on the end of the conduit 27 and is secured to the walls 7 of the casing by means of screws 29 or the like, which are preferably engaged through said wall and into the ring 28 from the inside of the casing, so that the conduit 27 and casing cannot be detached from the exterior. The open end of the conduit 27 is preferably closed by a plug 30 of cement or other suitable material.

After the casing has been secured to the end of the conduit, and the terminals of the conductors 25 of the cable inserted upwardly through the insulator 18 which has been slid into the slot 17, the panel or closure 13 is now secured to the casing and its tongue 19 will close the slot 17 and retain the insulator in place. A suitable sealing compound of insulating and non-magnetic material is then poured into the sealing chamber to fill said chamber and provide an insulating filler 31 filling said chamber and surrounding the terminal of the cable sheathing 25 and also fixing the insulator 18 and conductors 24 in place. The filler 31 in surrounding the flared portion 22 of the insulator below the partition 15 will anchor or fix the insulator to the filler, and such insulator being embedded or secured to the filler cannot be loosened or removed even though the panel or closure 13 is removed, unless the filler is broken out. The shelf or partition 15 has an opening 32 through which the insulating compound can be readily poured when the panel or closure 12 is removed from the casing. The insulating compound is of a material to harden or set, thereby providing a solid mass of insulating material around the terminal of the cable sheathing. The terminals of the conductors are therefore also insulated from one another by such material where they leave the sheathing and pass to the insulator, to prevent electro-static discharge between said conductors or between them and the sheathing 25. The filler 31 will also thoroughly insulate the terminal portion of the cable, and protect same from moisture, dust and other injurious agents, which are apt to cause short circuits. The plug or closure 30 for the end of the conduit 27 prevents the insulating material from flowing into the conduit.

The consumer's or building conduit 33 has one end engaged through one wall 8 of the casing above the shelf 15 to enter the connection chamber, and said terminal is secured to said wall by means of nuts 34 or the like. The consumer's conductors or load wires 35, which extend through said conduit 33, have their terminals extending within the connection chamber of the casing, and connected, as at 36, with the projecting terminals of the cable conductors. Such connections are conveniently made in said chamber when the panel or closure 12 is removed, and said panel is then secured to the casing, and is preferably sealed to prevent the removal of said panel or closure without breaking the seal, thereby avoiding unauthorized access to the conductor terminals between the cable and consumer's conduits. However, the seal can be broken and the panel or closure 12 removed for access to said terminals when required, but access to the sheathing 25 cannot be had without removing the panel or closure 13 and breaking out the filler 31.

The device thus affords adequate protection against the unauthorized access to the conductors between the conduits 27 and 33, as well as insulating the cable sheathing and conductors in a highly efficient manner, and protecting them from moisture, dust, and the like. Only the terminals of the cable conductors are free and exposed within the connection chamber of the casing or box. By the provision of the two chambers and panels or closures therefor, the terminal of the cable can be trimmed and the conductors inserted through the insulator into the connection or service chamber, and the sealing chamber then closed and filled with the sealing compound, leaving the connection or service chamber open for the connection of the conductors, with a separate closure for such chamber in order that repairs can be made when the panel or closure 12 is removed. The casing or housing can be used for any potential that is permissible with the conduit wiring.

Having thus described the invention, what is claimed as new is:—

1. A device of the character described comprising a casing having a sealing and a connection chamber and a partition between them, said partition having a slot, an insulator to be inserted in said slot, said casing having means for the entrance of a cable sheathing into said sealing chamber for the passage of the cable conductors through said insulator into the connection chamber, and closures for said chambers, said insulator having a portion to be anchored in a filler in the sealing chamber.

2. A device of the character described comprising a casing having two chambers and a partition between them, said partition having a slot for receiving an insulator, and a closure for the casing having a portion to enter said slot and hold the insulator in place.

3. A device of the character described comprising a casing having two chambers and a partition between them, said partition having a slot for receiving an insulator, and separate closures for said chambers, one closure having a tongue to enter said slot and retain the insulator in place.

4. A device of the character described comprising a casing having sealing and connection chambers, and a partition between them, said partition having a slot for receiving an insulator, the casing having means for attachment to a cable conduit for the entrance of a cable into the sealing chamber and for the passage of the cable conductors through such insulator, a closure for the sealing chamber having a portion to enter said slot and retain the insulator in place, and a separate closure for the connection chamber.

5. A device of the character described comprising a casing having a sealing and a connection chamber and a partition between them, said partition having a slot, an insulator inserted in said slot, the casing having means for attachment to a cable conduit for the entrance of the cable sheathing into the sealing chamber and for the extension of the cable conductors through said insulator into the connection chamber, a closure for the sealing chamber having a tongue entering said slot for holding the insulator in place, an insulating filler in the sealing chamber to embrace the sheathing, and a separate closure for the connection chamber.

In testimony whereof I have signed my name to this specification in the presence of two subscribing witnesses.

WILLIAM B. HERBST.

Witnesses:
FRANK SCHWARTZ,
W. G. WHITLINGER, Jr.